United States Patent
Yang

(10) Patent No.: US 11,148,103 B2
(45) Date of Patent: Oct. 19, 2021

(54) GAS SEPARATION MEMBRANE COMPRISING CROSSLINKED BLENDS OF RUBBERY POLYMERS

(71) Applicant: Saudi Arabian Oil Company, Dhahran (SA)

(72) Inventor: Junyan Yang, Acton, MA (US)

(73) Assignee: Saudi Arabian Oil Company, Dhahran (SA)

(*) Notice: Subject to any disclaimer, the term of this patent is extended or adjusted under 35 U.S.C. 154(b) by 140 days.

(21) Appl. No.: 16/702,040

(22) Filed: Dec. 3, 2019

(65) Prior Publication Data

US 2021/0162355 A1     Jun. 3, 2021

(51) Int. Cl.
| | | |
|---|---|---|
| B01D 53/22 | (2006.01) | |
| B01D 71/56 | (2006.01) | |
| B01D 67/00 | (2006.01) | |
| B01D 71/52 | (2006.01) | |

(52) U.S. Cl.
CPC ........... B01D 71/56 (2013.01); B01D 53/228 (2013.01); B01D 67/0013 (2013.01); B01D 71/52 (2013.01); B01D 2323/30 (2013.01); B01D 2323/345 (2013.01)

(58) Field of Classification Search
CPC .. B01D 71/56; B01D 53/228; B01D 67/0013; B01D 71/52; B01D 2323/30; B01D 2323/345
See application file for complete search history.

(56) References Cited

U.S. PATENT DOCUMENTS

| | | | |
|---|---|---|---|
| 8,317,900 B2 | 11/2012 | Peinemann et al. | |
| 10,300,438 B2* | 5/2019 | Nulwala | B01D 53/228 |
| 2004/0028370 A1* | 2/2004 | Bourdelais | G02B 6/138 |
| | | | 385/145 |
| 2007/0207186 A1* | 9/2007 | Scanlon | A61F 2/91 |
| | | | 424/424 |

(Continued)

FOREIGN PATENT DOCUMENTS

| | | |
|---|---|---|
| CN | 103894081 A | 7/2014 |
| CN | 106621864 A | 5/2017 |

OTHER PUBLICATIONS

Car, Anja, et al. "Pebax®/polyethylene glycol blend thin film composite membranes for CO2 separation: Performance with mixed gases." Separation and Purification Technology 62.1 (2008): 110-117.

Car, Anja, et al. "PEG modified poly (amide-b-ethylene oxide) membranes for CO2 separation." Journal of Membrane Science 307.1 (2008): 88-95.

(Continued)

*Primary Examiner* — Anthony R Shumate
(74) *Attorney, Agent, or Firm* — Leason Ellis LLP

(57) ABSTRACT

A method for making a gas separation membrane comprises dissolving and mixing poly(ether-b-amide) (Pebax) copolymer and acrylate-terminated polyethylene glycol oligomers (PEGDA) in a solvent, casting the polymer solution into a mold, removing the solvent to form a film, adding a photoinitiator to the film and irradiating the film with ultraviolet radiation to induce crosslinking of the PEGDA in the film, producing XLPEGDA, and submerging the film after exposure in a crosslinking solution to form crosslinked Pebax (XLPebax) in the film, wherein the crosslinking solution comprises one of a diisocyanate, a diisocyanate derivative and a combination of a diiscyanate and a diisocyanate derivative.

14 Claims, 8 Drawing Sheets

(56) References Cited

U.S. PATENT DOCUMENTS

| | | | | |
|---|---|---|---|---|
| 2008/0234659 A1* | 9/2008 | Cheng | ............... | A61M 25/0017 |
| | | | | 604/523 |
| 2009/0187254 A1* | 7/2009 | Deal | ....................... | A61L 31/10 |
| | | | | 623/23.7 |
| 2014/0178582 A1* | 6/2014 | Gaynor | .................. | B01D 71/80 |
| | | | | 427/245 |
| 2016/0243525 A1* | 8/2016 | Song | ........................ | B01J 20/18 |
| 2018/0065105 A1* | 3/2018 | Song | .................. | B01J 20/28035 |
| 2018/0345211 A1* | 12/2018 | Yang | .................. | B01D 67/0002 |
| 2019/0060845 A1* | 2/2019 | Yang | .................. | B01D 67/0013 |
| 2019/0247804 A1* | 8/2019 | Long | ....................... | B01D 53/04 |
| 2019/0290817 A1* | 9/2019 | Guo | .................... | A61M 60/148 |
| 2021/0079211 A1* | 3/2021 | Mohanty | ................. | C08L 67/02 |

OTHER PUBLICATIONS

Lillepärg, Jelena, Prokopios Georgopanos, and Sergey Shishatskiy. "Stability of blended polymeric materials for $CO_2$ separation." Journal of membrane science 467 (2014): 269-278.

Ghadimi, Ali, et al. "Preparation of alloyed poly (ether block amide)/poly (ethylene glycol diacrylate) membranes for separation of $CO_2/H_2$ (syngas application)." Journal of membrane science 458 (2014): 14-26.

Liu, Song Lin, et al. "Recent progress in the design of advanced PEO-containing membranes for $CO_2$ removal." Progress in Polymer Science 38.7 (2013): 1089-1120.

Sridhar, S., et al. "Development of crosslinked poly (ether-block-amide) membrane for $CO_2/CH_4$ separation." Colloids and Surfaces A: Physicochemical and Engineering Aspects 297.1-3 (2007): 267-274.

* cited by examiner

GAS SEPARATION MEMBRANE COMPRISING CROSSLINKED BLENDS OF RUBBERY POLYMERS

CROSS-REFERENCE TO RELATED APPLICATIONS

The present application is related to U.S. patent application Ser. No. 15/608,403, ('403 application), entitled "Polymer Blended Membranes for Sour Gas Separation" published as U.S. Patent Publication No. 2018/0345211 on Dec. 6, 2018. The present application is also related to U.S. patent application Ser. No. 15/691,372, entitled "Crosslinked Polymeric Membranes for Gas Separation," originally published on Feb. 28, 2019 and later granted as U.S. Pat. No. 10,272,394 ('394 patent). Both the '403 application and the '394 patent are hereby incorporated by reference in their respective entireties for any purpose.

FIELD OF THE DISCLOSURE

The present disclosure concerns gas separation technology, and more particularly related to a gas separation membrane that includes crosslinked blends of rubbery polymers.

BACKGROUND OF THE DISCLOSURE

Natural gas reservoirs typically contain, beside their light hydrocarbon content, a complex mixture of acid gases (e.g., carbon dioxide, and hydrogen sulfide) heavy hydrocarbons, inert gases, and trace components of many other compounds. At high concentrations, $CO_2$ or $H_2S$ in combination with water is corrosive, and, therefore, can destroy pipelines or other equipment. Furthermore, the presence of $CO_2$ reduces the heating value of natural gas. Therefore, natural gas from natural gas reservoirs or "produced gas" is processed prior to distribution and usage.

One of the ways of separating $CO_2$ and $H_2S$ is by use of gas-selective polymeric membranes. Polymeric membranes are thin semipermeable barriers that selectively separate some gas compounds from others. These membranes do not operate as a filter in which small molecules are separated from larger ones through a medium with pores, but rather, separate based on how well different compounds dissolve into and diffuse through the membrane (the solution-diffusion model). Membranes are generally easy to manufacture, have relatively low material cost, robust physical characteristics, and good intrinsic transport properties, as compared to the conventional methods for acid gas separation such as acid gas amine scrubbing. However, polymeric membranes designed for gas separations are known to have a trade-off between permeability (how fast molecules move through the membrane material) and selectivity (the extent to which desired molecules are separated from undesired molecules). In addition, membranes face other significant material challenges, such as physical aging and plasticization.

Certain glassy polymers, such as cellulose acetate (CA), polyimide (PI), and polysulfone (PSF), have been used for sour gas removal from natural gas, due to their high thermal stability. CA polymer membranes may be used for $CO_2$ separation and exhibit high pure gas carbon dioxide/methane ($CO_2/CH_4$) selectivity. However, due to their plasticization at high $CO_2$ pressure or in the presence of significant amounts of higher-hydrocarbon contaminants, glassy polymers, such as CA, exhibit much lower $CO_2/CH_4$ mixed gas selectivities and exhibit very low $CO_2$ permeability (approximately 5 Barrer=$3.75\times10^{-17}$ $m^2 \cdot s^{-1} \cdot Pa^{-1}$) which does not meet some industrial requirements. Similarly, another commercially available polyimide exhibits higher $CO_2/CH_4$ pure gas selectivity of 40, but still much lower $CO_2$ permeability of less than 12 Barrer (=$9.00\times10^{-17}$ $m^2 \cdot s^{-1} \cdot Pa^{-1}$).

Poly (ether-b-amide) block copolymer (referred to as "Pebax") is a hydrophilic commercially available thermoplastic elastomer that has been investigated extensively for its gas separation properties. Due to its polar ether groups (ethylene oxide units, EO), which have high affinity to $H_2S$ and $CO_2$ molecules, Pebax materials have shown good membrane performance for sour gas separation, high $H_2S$ permeability and excellent $H_2S/CH_4$ separation performance. However, since Pebax rubbery membranes separate based on solubility selectivity, the $CO_2/CH_4$ separation efficiency of these rubbery membranes is significantly below state-of-the art glassy polymers such as CA and PI, which separate gas molecules primarily based on size selectivity.

Crosslinking is a polymer structure modification that can help in reducing the chain mobility and thus produce an increase of the glass transition temperature ($T_g$). Crosslinking has been used to produce Pebax membranes that have improved efficiencies (e.g. $CO_2/CH_4$ selectivity) and increased mechanical strength. However, reported crosslinked membrane permeability is much lower than pure, uncrosslinked (referred to as "neat") Pebax (see Sridhar et al, *Colloids and Surface A: Phys. Chem, Eng. Aspects*, 297, 267-274, 2007). Blending PEG-based polymer additives with Pebax membranes has been shown to increase membrane $CO_2$ permeability and decrease $CO_2/CH_4$ selectivity. Since PEG additives are soluble, they tend to swell and be leeched by water that is present in many industrial wet gas or vapor streams, resulting in the decrease of separation performance.

SUMMARY OF THE DISCLOSURE

Ongoing needs exist to obtain polymer membranes that have improved $CO_2$ permeability, thermal stability, and $CO_2/CH_4$ pure gas selectivity. The membranes in this disclosure achieve such improved membrane properties.

Embodiments of the present disclosure provide a method for making a gas separation membrane. The method comprises dissolving and mixing poly(ether-b-amide)(Pebax) copolymer and acrylate-terminated polyethylene glycol oligomers (PEGDA) in a solvent to define a polymer solution, casting the polymer solution into a mold, removing the solvent to form a film, adding a photoinitiator to the film and irradiating the film with ultraviolet radiation to induce crosslinking of the PEGDA in the film, producing XLPEGDA, and submerging the film, after exposure in a crosslinking solution to the ultraviolet radiation, to form crosslinked Pebax (XLPebax) in the film, wherein the crosslinking solution comprises a diisocyanate derivatives.

In some embodiments, the diisocyanate derivative comprises diiocyanate polyether has a formula:

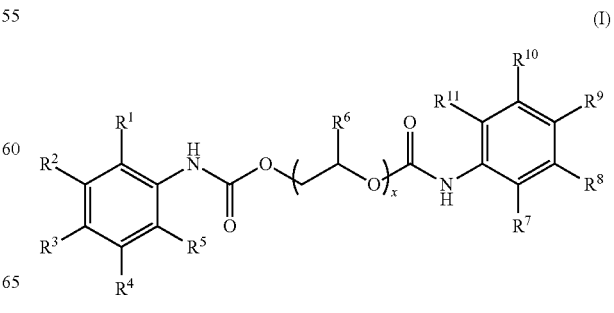

(I)

in which each $R^6$ is independently an alkyl or —H; x is from 1 to 200; and $R^1$, $R^2$, $R^3$, $R^4$, $R^5$, $R^7$, $R^8$, $R^9$, $R^{10}$, and $R^{11}$ is independently —C=N=O, alkyl or —H, provided that at least one and not more than two of R', $R^2$, $R^3$, $R^4$ and $R^5$ is —C=N=O and at least one and not more than two of $R^7$, $R^8$, $R^9$, $R^{10}$, and $R^{11}$ is independently —C=N=O.

In certain embodiments, in the diisocyanate derivatives comprise tolylene-2,4-diisocyanate (TDI), hexamethylene-diisocyanate (HDI), 4,4'-Methylenediphenyl diisocyanate (MDI), or Dimethoxy biphenylene diisocyanate (DMDI).

In certain implementations, the photoinitiator employed is 1-hydroxycyclohexyl phenyl ketone (HCPK), benzophenone or combinations thereof.

In the dissolving step, the PEGDA can comprise between about 1 wt. % and about 90 wt. % of the Pebax. In some implementations, the PEGDA comprises between about 5 wt. % and 80 wt. % of the Pebax.

In the submerging step, the crosslinking solution can comprise a 0.5 wt. % to 10 wt. % solution of TDI in hexane.

In some implementations, the film is submerged in crosslinking solution for between 5 and 25 minutes.

Embodiments of the present disclosure also provide a gas separation membrane. The membrane comprises a crosslinked poly(ether-b-amide) copolymer (XLPebax), in which the poly(ether-b-amide) copolymer comprises urethane crosslinks which is the reaction product of poly(ether-b-amide) copolymer and a diisocyanate polyether, and a poly(ether-b-amide) copolymer, crosslinked to an acrylate-terminated poly(ethylene glycol) (XLPEGDA).

In some embodiments, the diisocyanate polyether has a formula:

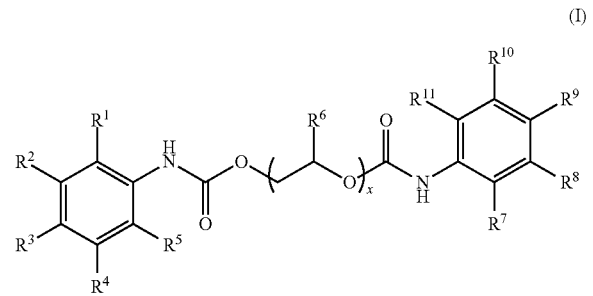

(I)

in which each $R^6$ is independently an alkyl or —H; x is from 1 to 200; and $R^1$, $R^2$, $R^3$, $R^4$, $R^5$, $R^7$, $R^8$, $R^9$, $R^{10}$, and $R^{11}$ is independently —C=N=O, alkyl or —H, provided that at least one and not more than two of $R^1$, $R^2$, $R^3$, $R^4$ and $R^5$ is —C=N=O and at least one and not more than two of $R^7$, $R^8$, $R^9$, $R^{10}$, and $R^{11}$ is independently —C=N=O.

In certain embodiments, the diisocyanate derivatives comprise tolylene-2,4-diisocyanate (TDI), hexamethylene-diisocyanate (HDI), 4,4'-Methylenediphenyl diisocyanate (MDI), or Dimethoxy biphenylene diisocyanate (DMDI). The gas separation membrane can be formed with a thickness ranging from about 30 micrometers to about 70 micrometers (μm).

In some embodiments, the PEGDA comprises between about 1 wt. % and about 90 wt. % of the Pebax within the membrane. In certain implementations, the PEGDA comprises between about 5 wt. % and about 80 wt. % of the Pebax within the membrane.

These and other aspects, features, and advantages can be appreciated from the following description of certain embodiments of the invention and the accompanying drawing figures and claims.

DETAILED DESCRIPTION OF CERTAIN EMBODIMENTS OF THE DISCLOSURE

Figure 1:
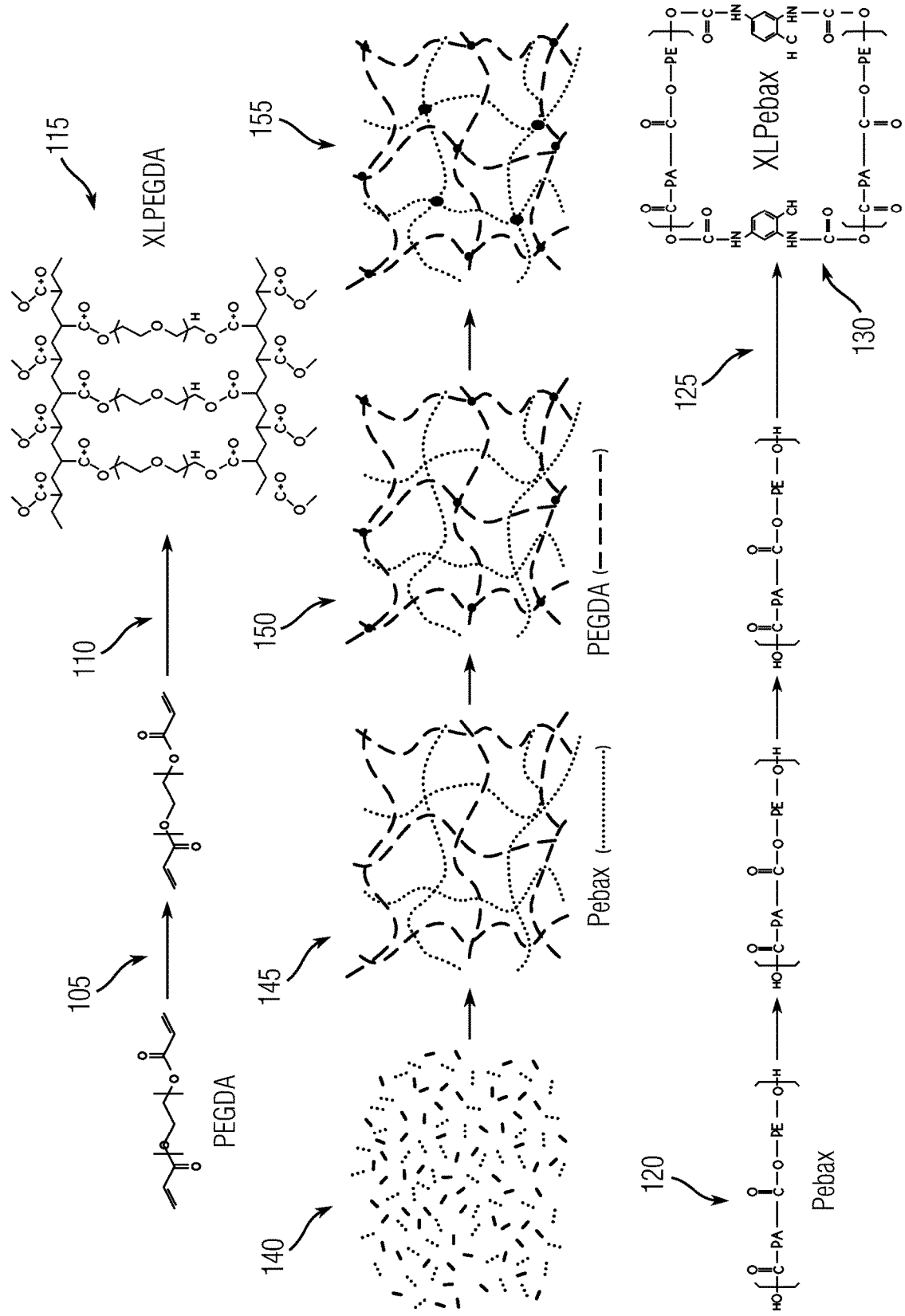
FIG. 1 is schematic diagram illustrating the fabrication of XLPebax, XLPEGDA and the blended combination of crosslinked molecules in the XLPebax/XLPEGDA polymer network of the present disclosure.

The present disclosure provides a novel rubbery polymer network material and a method to produce a membrane using the new crosslinked rubbery polymer network for sour gas separation ($CO_2/CH_4$ and $H_2S/CH_4$) applications. The new crosslinked rubbery polymer network (referred to herein as a "polymer membrane network") is composed of a crosslinked blend of two components. A matrix component is comprised of crosslinked Pebax rubbery polymer (referred to as "XLPebax"). The Pebax is crosslinked with a diisocyanate, such as toluene diisocyanate (TDI). In other implementations, the diiscyanate can be hexamethylene-diisocyanate (HDI), 4,4'-Methylenediphenyl diisocyanate (MDI), or Dimethoxy biphenylene diisocyanate (DMDI). Crosslinked polyethylene glycol diacrylate (referred to as "XLPEGDA") is incorporated into the XLPebax matrix. The resulting polymer membrane network is referred to as an XLPebax/XLPEGDA. The XLPebax/XLPEGDA blend is an interpenetrating polymer network (IPN) in which the two different polymer networks (XLPebax and XLPEGDA) physically or chemically interact with each other. The interconnections between the constituent polymers in an IPN are believed to reduce the undesirable swelling effects of polymers by highly condensable gases, and to enhance membrane permeation and separation performance.

As described in the above-referenced '394 patent, XLPebax is comprised of cross-linked poly(ether-b-amide) (PEBA) copolymer. In some embodiments, the poly(ether-b-amide) (PEBA) copolymer can include a soft segment of from 60% to 80% by weight and a hard segment of from 40% to 20% by weight. Such polymers are available commercially as various grades such as Pebax® 1657, 1074, 5513, 2533, and 3000 etc. from Arkema, Inc. In some embodiments, the poly(ether-b-amide) block copolymer is Pebax 1657. The PEBA copolymer forms crosslinks through the addition of a diisocyanate polyether. The poly(ether-b-amide) copolymer reacts with the isocyanate groups of the diisocyanate polyether and forms a urethane functional group, thereby crosslinking one PEBA strand with another PEBA. The diisocyanate polyether may include a structure according to formula (I):

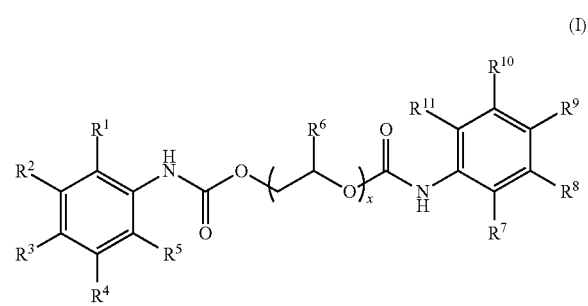

In formula (I), each $R^6$ is independently an alkyl or —H; subscript x is from 1 to 200. $R^1$, $R^2$, $R^3$, $R^4$, $R^5$, $R^7$, $R^8$, $R^9$, $R^{10}$, and $R^{11}$ is independently —C=N=O, alkyl or —H, provided that one of $R^1$, $R^2$, $R^3$, $R^4$ and $R^5$ is —C=N=O, and one of $R^7$, $R^8$, $R^9$, $R^{10}$, and $R^{11}$ is —C=N=O. The alkyl may have 1 to 20 carbon atoms. In some embodiments of the diisocyanate polyether according to formula (I), $R^6$ is methyl, ethyl, propyl, 2-propyl, n-butyl, tert-butyl, pentyl, hexyl, heptyl, octyl, nonyl, or —H. The formula "—C=N=O" may be referred to using the term "isocyanate." The term "isocyanate" and the formula "—C=N=O" may be interchangeable. In some embodiments of the diisocyanate polyether according to formula (I), $R^4$ and $R^8$ are C=N=O; $R^3$ and $R^9$ are methyl; and $R^6$ is methyl.

In some embodiments, the diisocyanate polyether according to formula (I), x may be an integer from 2 to 200, 50 to 180, 75 to 170, 20 to 100, or from 2 to 50. In some embodiments, the diisocyanate polyether has a weight average molecular weight of approximately 400 grams per mole (g/mol) to 10,000 g/mol, 425 to 900 g/mol, or approximately 700 g/mol.

As described in above-referenced '403 application, XLPEGDA comprises a mixture of poly(ether-b-amide) copolymer and acrylate-terminated poly(ethylene glycol) (PEG), in which the acrylate-terminated poly(ethylene glycol) is cross-linked with another acrylate-terminated poly(ethylene glycol) polymer strand. The term "terminated" as used in "acrylate-terminated" refers to a carbon-carbon double bond in which one of the carbon atoms in the double bond is at the end of the chain, and therefore is bonded to two hydrogen atoms. The acrylate-terminated PEG may include polymers according to formulas (I) or (II):

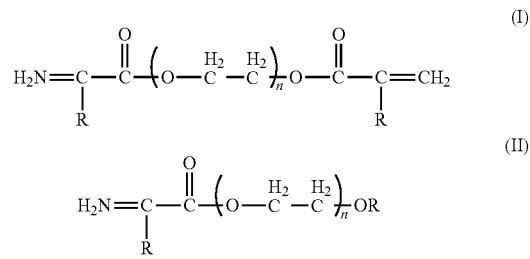

In formulas (I) and (II), each n is of from 2 to 30; and each R is independently —H or —$CH_3$.

FIG. 1 is schematic diagram illustrating the fabrication of XLPebax, XLPEGDA and the blended combination of crosslinked molecules in the XLPebax/XLPEGDA polymer network of the present disclosure. As shown, linear chains of PEGDA polymer 105 are treated with a crosslinking initiator 110, yielding XLPEGDA 115 having chains of PEGDA polymer linked crosswise by other PEGDA molecules. At the bottom of FIG. 1, linear chains of Pebax (PEBA) polymer 120 react with a toluene diisocyanate (TDI) crosslinker 125 resulting in XLPebax 130.

When the PEBA copolymer reacts with a diisocyanate polyether the PEBA copolymers are linked through urethane groups formed when an isocyanate group of the diisocyanate polyether reacts with the alcohol functional group of the PEBA. Scheme 1 illustrates the reaction and the reaction product of diisocyanate polyether and PEBA, but it not meant to be defining or limiting. In Scheme 1, shown below, PEBA is a polyether block amide, in which the PA represents the polyamide segments, PE represents the polyether segments, and n is an arbitrary number greater than 1. The diisocyanatein Scheme 1 is representative of diisocyanate polyether of formula (I), in which L links one isocyanate group with the other isocyanate group. The urethane groups linking the diisocyanate and the PEBA copolymer in the Reaction Product are surrounded by dashed rectangles. As previously mentioned, Scheme 1 is merely illustrative. For example, in Scheme 1, two diisocyanate molecules crosslink the same two PEBA copolymers.

Scheme 1: Reaction Product of PEBA and Diisocyanate Polyether

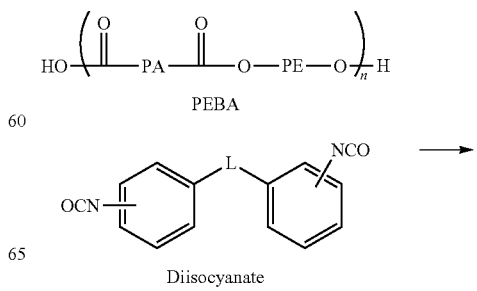

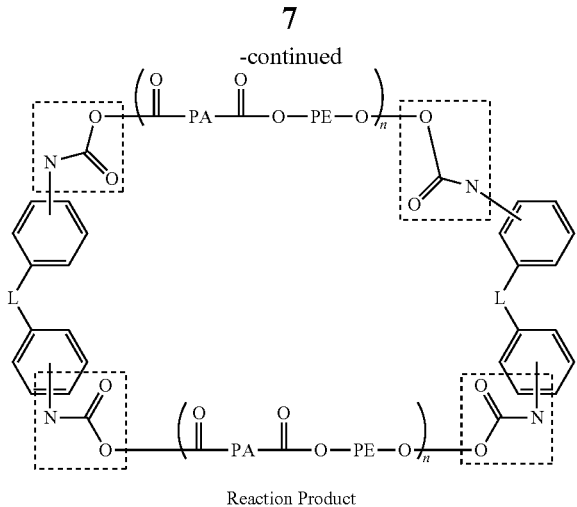

Reaction Product

Returning to FIG. 1, a mixture of PEGDA and Pebax is thoroughly blended 140 into a network matrix 145. Exposure to ultraviolet (UV) light is used to crosslink the PEGDA within the network. Thereafter, TDI crosslinked is added to crosslink the Pebax 150, yielding a XLPebax/XLPEGDA membrane network 155.

Figure 2:
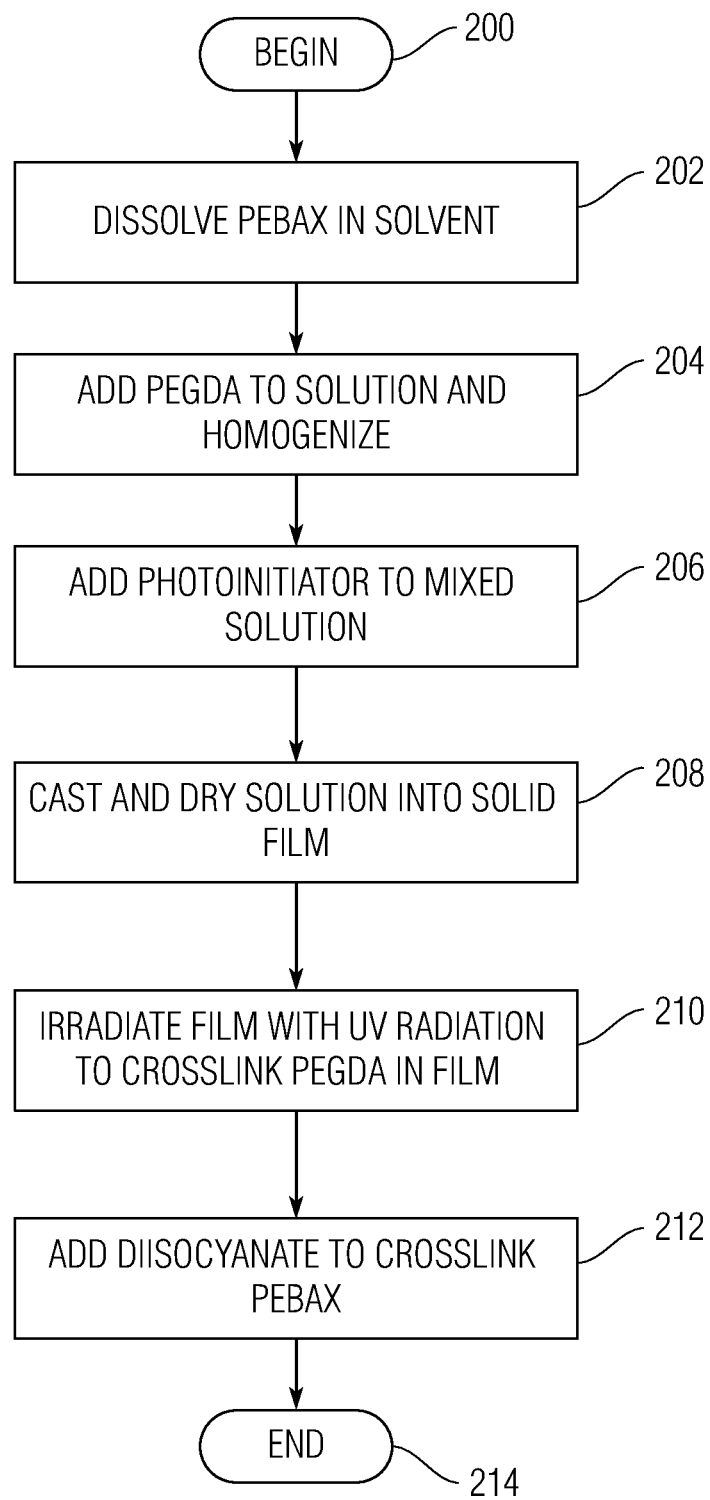
FIG. 2 is a flow chart of a more detailed method for preparing an XLPebax/XL PEGDA membrane according to the present disclosure.

FIG. 2 is a flow chart of a more detailed method for preparing an XLPebax/XL PEGDA membrane according to the present disclosure. In a first step 200, the method begins. In a second step 202, dried Pebax 1657 resin is dissolved in a mixture of ethanol and deionized water (70/30 vol/vol %) at a concentration (of Pebax) of 1-10% by weight (wt. %). In step 204, PEGDA is added to the Pebax solution and the mixture is stirred until the solution becomes homogeneous. The amount of PEGDA can range from 1 wt. %-150 wt. % and more typically from 5 wt. % to 80 wt. % based on the weight of the Pebax. In step 206, a selected amount of 1-hydroxycyclohexyl phenyl ketone (HCPK) is added in proportion to the amount of PEGDA in the polymer solution. HCPK acts as a photoinitiator for cross-linking strands of PEGDA in the solution at a later stage. Other photoinitiators can be used instead of, or in addition to, HCPK. In a following step 208, a dense film is developed from the solution by casting the polymer solution in molds and then allowing or assisting the solution to evaporate to create a solid membrane material. For example, the membrane can be dried at room temperature for a duration (e.g., several hours) which allows the solvent to evaporate.

Crosslinking of the blended membrane material begins in step 210 in which the material is irradiated with ultraviolet light. The light causes the photoinitiator to initiate cross-linking of the linear strands of PEGDA polymer. In step 212, the film is immersed in a diisocyanate derivatives to cross-link the Pebax, producing the XLPebax/XLPEGDA membrane. The preparation method ends in step 214.

EXAMPLES

The following more specific examples of membrane preparation are illustrative of different parameters, weights, durations and other factors that can be employed in membrane preparation and are not to be taken as limiting.

Example 1 (Membrane 1)

A sample of 0.8 g dried poly (amide-b-ether) (Pebax 1657) was dissolved in a mixture of 20 mL ethanol/deionized (DI) water (70/30 v/v). The reaction mixture was vigorously stirred at 85° C. under reflux for at least 6 hours to obtain a homogeneous solution. 0.32 g pf polyethylene glycol diacrylate (PEGDA) (MW=750) was added into Pebax solution and mechanical stirred for at least 2 hours at 60° C. to form a homogeneous solution. Then 12.8 mg (4 wt. % of weight of PEGDA) of 1-hydroxycyclohexyl phenyl ketone (HCPK) was added into the solution and mechanical stirred at 60° C. for 30 min. The solution was poured into pre-heated (50 to 60° C.) PTFE flat-bottomed Petri dishes to prepare the dense Pebax/PEGDA membrane film. This dense film was dried at room temperature overnight with a cover for slow solvent evaporation. The film was removed from PTFE Petri dishes for further crosslinking. The obtained Pebax/PEGDA blended membrane was photopolymerized by exposure to 318 nm UV light in a UV Crosslinker device (Model 13-245-221, Fisher Scientific) with intensity of 12,000 mW/cm$^2$ for 180 seconds at 25° C., producing the Pebax/XLPEGDA membrane. The obtained Pebax/XLPEGDA membrane was placed in a vacuum oven for further drying at 40-60° C. for at least 48 hours. Diisocyanate-crosslinking of Pebax/XLPEGDA membrane was carried out by immersing the above prepared Pebax/XLPEGDA membrane into a 2 wt. %/v solution of tolylene-2,4-diisocyanate (TDI) in hexane for 10 minutes. Then the membrane was removed from the TDI solution and washed thoroughly in hexane and deionized water for 30 minutes to remove the residue of crosslinker. The membrane was dried at room temperature overnight, and then dried in a vacuum oven at 40-60° C. for 48 hours. The obtained XLPebax/XLPEGDA membrane ("Membrane 1") had an average thickness of 30 to 70 μm and was used for physical property characterization and permeation testing.

Example 2 (Membranes 2 and 3)

A sample of 0.8 g dried Pebax 1657 was dissolved in a mixture of 20 mL ethanol/deionized (DI) water (70/30 v/v). The reaction mixture was vigorously stirred at 85° C. under reflux for at least 6 hours to obtain a homogeneous solution. 0.48 g PEGDA (molecular weight of 750) was added to the Pebax solution and stirred for at least 2 hours at 60° C. to form a homogeneous solution. Then 9.6 mg of 1-hydroxycyclohexyl phenyl ketone (HCPK) as a photoinitiator was added into the solution (2 wt. % of weight of the PEGDA) and stirred at 60° C. for 30 min. The resulting solution was poured into pre-heated (at 50 to 60° C.) flat-bottomed Petri dishes to prepare the dense film (Pebax/PEGDA membrane). This dense film was dried at room temperature overnight with a cover for slow solvent evaporation. The obtained Pebax/PEGDA blended membranes were removed from the dishes and photopolymerized by exposure to 318 nm UV light in a UV Crosslinker device (Model 13-245-221, Fisher Scientific) with intensity of 12,000 mW/cm$^2$ for 180 seconds at 25° C. This procedure crosslinked the PEGDA, producing Pebax/XLPEGDA membranes. The obtained Pebax/XLPEGDA membranes were placed in a vacuum oven for further drying at 40-60° C. for at least 48 hours. Diisocyanate-crosslinking of Pebax/XLPEGDA membrane was carried out for two different durations by immersing the Pebax/XLPEGDA membrane in a 4 wt. %/v solution of TDI in hexane for 5 minutes ("Membrane 2") and 20 minutes ("Membrane 3"). Membrane 2 and Membrane 3 were then removed from TDI solution and washed thoroughly in hexane and DI water for 30 minutes to remove the residue of crosslinker. Both membranes were dried at room temperature overnight, and then dried in a vacuum oven at 40-60° C. for 48 hours. The obtained XLPebax/XLPEGDA membranes had an average thickness of 30 to 70 μm and were used for physical property characterization and permeation testing.

"Control" membranes with pure ("neat") materials and mixed materials were also produced to test and compare against the XLPebax/XLPEGDA membranes (Membrane 1-3). The control membranes includes a first control membrane (Control Membrane 1) composed of neat Pebax, a second control membrane (Control Membrane 2) composed of a Pebax/PEGDA blend, a third control membrane composed of a Pebax/XLPEGDA blend produced using 0.32 g of PEGDA per 0.8 g of Pebax (Control Membrane 3), and a fourth control membrane composed of a Pebax/XLPEDGA blend produced using 0.48 g PEGDA per 0.8 g of Pebax (Control Membrane 4).

Membrane Characterization

The membranes were characterized structurally, thermally, and mechanically. Thermogravimetric analysis was also performed. Structural analysis was performed using Fourier transformed infrared spectroscopy (FTIR); thermal characterization was performed using differential scanning calorimetry (DSC); mechanical characterization was performed via Universal Instron and thermogravimetric analysis (TGA).

Figure 3A:
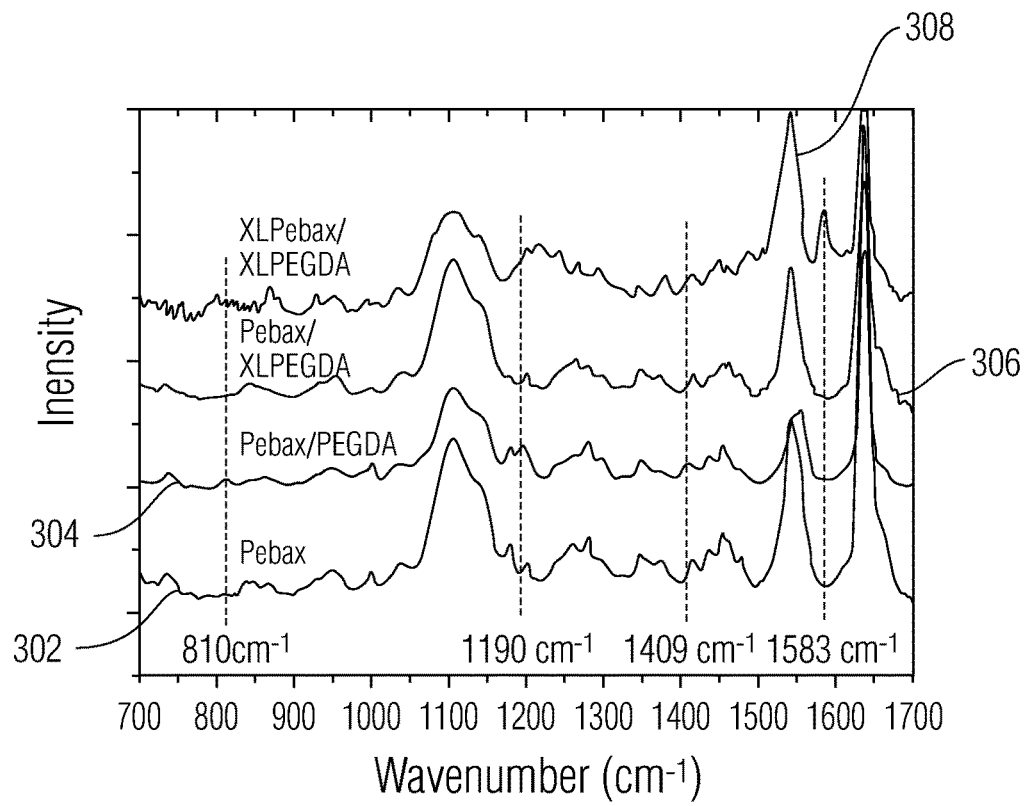
FIG. 3A is a graph of FTIR spectra of neat Pebax, Pebax/PEGDA, Pebax/XLPEGDA and XLPebax/XLPEGDA membranes.

FTIR spectra were obtained using a Nicolet iS50 FTIR in ATR mode with 128 scans at a resolution of 2 cm$^{-1}$ in the range of 700-4000 cm$^{-1}$. The background was obtained at the same conditions without a sample in place. FIG. 3A is a graph of FTIR spectra of neat Pebax 302, Pebax/PEGDA 304, Pebax/XLPEGDA 306 and XLPebax/XLPEGDA 308 membranes. As FIG. 3A shows, the XLPebax/XLPEGDA spectrum 308 is clearly distinguishable from the Pebax/XLPEGDA spectrum 306, indicating the both the completion of UV crosslinking reaction of PEGDA within the Pebax membrane matrix and the further TDI-crosslinking of the Pebax matrix. Both the Pebax/XLPEGDA and XLPebax/XLPEGDA blended membranes lack characteristic acrylic absorptions that appear in the spectrum pure PEGDA (1409 cm$^{-1}$, 1190 cm$^{-1}$, 810 cm$^{-1}$), indicating the consumption of acrylic double bonds leading to the successful formation of a crosslinked PEG structure. Furthermore, the formation of urethane linkages between Pebax block copolymer polymer and TDI was also confirmed by FTIR spectra. As shown in FIG. 5, the XLPebax/XLPEGDA blended membrane spectrum includes a vibration band at about 1583 cm$^{-1}$ corresponding to a —NH—CO group which indicates formation of urethane linkages.

Figure 3B:
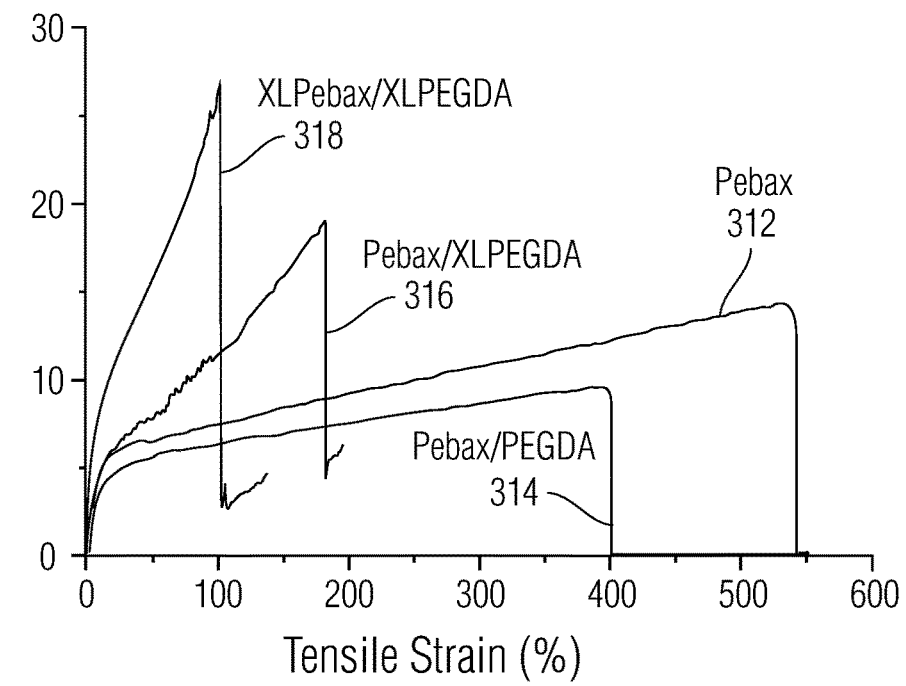
FIG. 3B is a graph of stress-strain curves of neat Pebax, Pebax/PEGDA, Pebax/XLPEGDA and XLPebax/XLPEGDA membranes.

FIG. 3B is a graph of stress-strain curves of neat Pebax 312, Pebax/PEGDA 314, Pebax/XLPEGDA 316 and XLPebax/XLPEGDA 318 membranes. Results of the mechanical characterization tests (tensile stress, elongation and Young's modulus) are also summarized in Table I. XLPebax/XLPEGDA membranes demonstrated a significant increase in mechanical strength (e.g. 120%, 186% and 46% increase in tensile strength and 60%, 222% and 130% increase in Young's modulus) compared to neat Pebax, Pebax/PEGDA and Pebax/XLPEGDA blended membranes, respectively. This is due to the bonding of the XLPebax through the urethane crosslinkages.

TABLE I

| Membranes | Tensile stress (MPa) | Tensile strain (%) | Young's Modulus (MPa) |
| --- | --- | --- | --- |
| Neat Pebax | 12.7 + 1.7 | 470.7 + 16.8 | 89.0 + 4.7 |
| Pebax/PEGDA | 9.8 + 1.2 | 391.5 + 13.2 | 44.2 + 3.5 |
| Pebax/XLPEGDA | 19.2 + 1.5 | 182.4 + 12.8 | 61.7 + 6.4 |
| XLPebax/XLPEGDA | 28.0 + 2.5 | 108.6 + 15.6 | 142.2 + 18.8 |

Figure 3C:
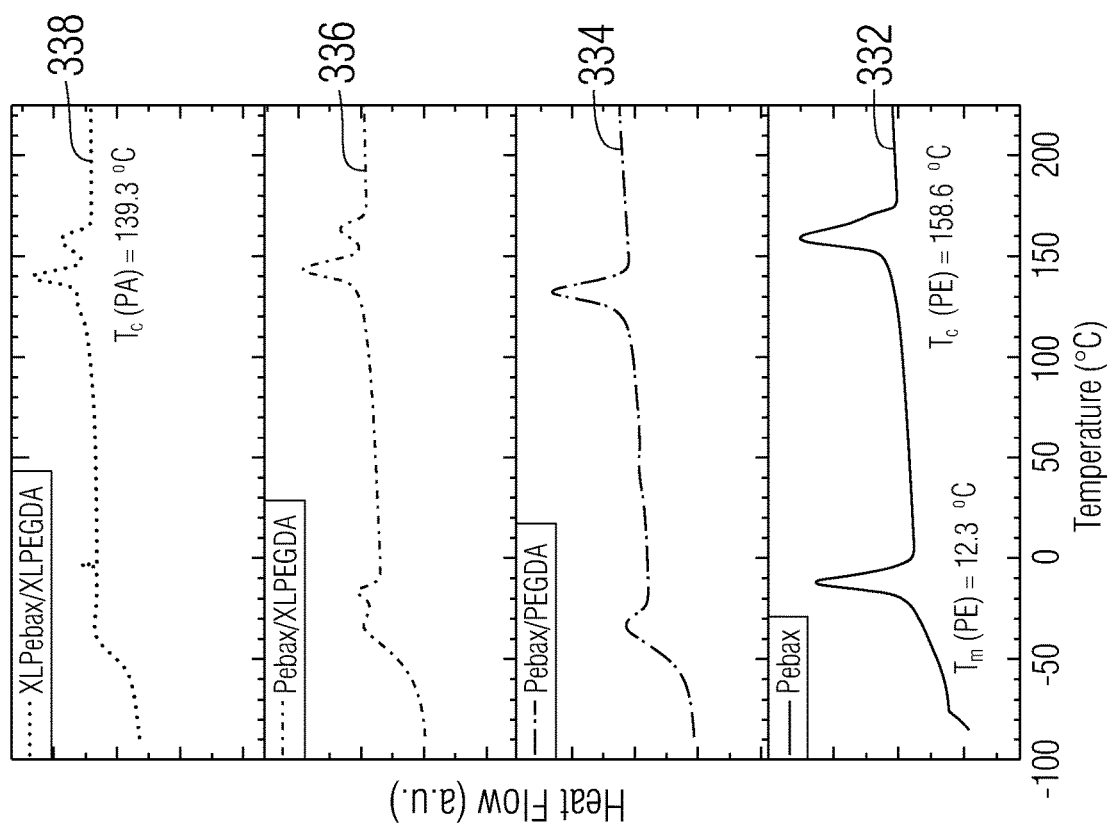
FIG. 3C shows heating curves of neat Pebax, Pebax/PEGDA, Pebax/XLPEGDA and XLPebax/XLPEGDA membranes.
Figure 3D:
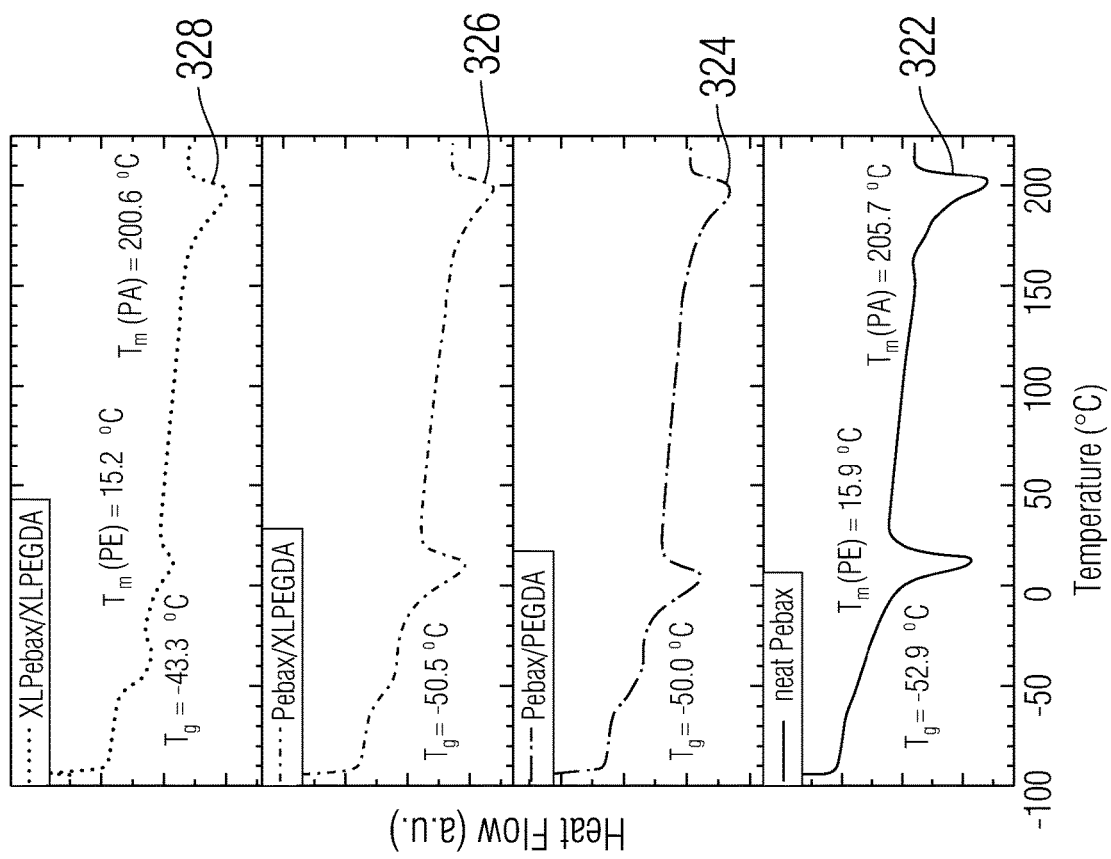
FIG. 3D shows cooling curves of neat Pebax, Pebax/PEGDA, Pebax/XLPEGDA and XLPebax/XLPEGDA membranes.

Tests of the thermal properties of the membranes, including glass transition temperature ($T_g$), melting temperature ($T_m$) and crystallization temperature ($T_c$), were characterized by using Discovery DSC (Differential Scanning Calorimetry). In the tests, each sample, of 5-7 mg, was scanned from −150 to 100° C. at a scanning rate of 10° C./min. FIG. 3C shows heating curves of neat Pebax 322, Pebax/PEGDA 324, Pebax/XLPEGDA 326 and XLPebax/XLPEGDA 328 blended membranes and FIG. 3D shows cooling curves of the corresponding membranes 332-338. The Pebax/PEGDA (curves 324, 334) and Pebax/XLPEGDA (curves 326, 336) shows slight increase in membrane $T_g$ and both $T_m$ and $T_c$ compared to neat Pebax (curves 322, 324). Further crosslinking with TDI helps in reducing the chain mobility, thus resulting in an increase of $T_g$ as shown in the XLPebax/XLPEGDA (curves 328, 338) (22% increase in $T_g$), compared to the neat Pebax membrane. The increase of $T_g$ potentially contributes to the enhancement in membrane gas separation efficiency by increasing selectivity.

To test pure and mix gas permeation, membrane swatches with surface areas of about 0.7-3.5 cm$^2$ were cut from the above-discussed membranes. The swatches were masked with aluminum foil and sealed with a two-component, quick-setting epoxy. The epoxy was allowed to cure for at least 12 hours before the membrane was loaded into the permeation cell. Single gas permeation measurements were performed using a time-lag method with pure CH$_4$ and CO$_2$ at a feed pressure of 100 psi and an operating temperature of 25° C. The testing system was configured to operate in constant volume and variable feed pressure mode to determine permeance via time dependent change of pressure in feed and permeate vessels. A Millipore permeation cell with 47 mm disc filters was employed. An epoxy masked membrane sample of 10-20 mm in diameter was inserted and sealed in the Millipore testing cell and the system was evacuated for at least 30 min.

Gas permeation tests were performed using a constant-volume, variable-pressure technique. A stainless steel permeation cell with 47 mm disc filters was purchased from EMD Millipore, a business unit of Merck KGaA. An epoxy masked membrane sample of 5-20 mm in diameter was inserted and sealed in the testing cell. Baratron absolute capacitance transducers from MKS Instruments, Inc. were used to measure the upstream and downstream pressures via a LabView script. Permeability, $P_i$, of a gas, i, was calculated according to equation (1)

$$P_i = \frac{\frac{dp}{dt} V L}{A \Delta f_i RT} \quad (1)$$

in which dp/dt is the slope of the steady state pressure rise for the permeate, V is the effective downstream volume, L is the membrane thickness, A is the surface area of membrane, $\Delta f_i$ is the partial fugacity difference across the membrane calculated using the Peng-Robinson equation, R is the ideal gas constant, and T is the temperature. Steady-state permeation was verified using the time-lag method where 10 times the diffusion time-lag was taken as the effective steady-state. Selectivity, $\alpha_{i,j}$ is defined as the ratio of permeabilities:

$$\alpha_{i,j} = \frac{P_i}{P_j}, P_i > P_j \quad (2)$$

Single gas permeability coefficients were measured at room temperature for $CH_4$ and $CO_2$ at 100 psi. Membranes were degassed under vacuum for 1 hour prior to each test. Steady-state permeation was verified using the time-lag method where 10 times the diffusion time-lag was taken as the effective steady-state. The upstream (feed) pressure and the downstream (permeate) pressure were measured using Baraton absolute capacitance transducers (MKS Instruments, Inc.) and recorded using LabVIEW software available from National Instruments of Austin, Tex. The permeate pressure was maintained below 100 torr.

Mixed gas permeation was performed at room temperature and feed pressure range of 200 psi to 800 psi under two different sour gas mixtures (3 and 5-component mixtures containing 5% and 20% $H_2S$). After degassing for 1 hour, membranes were pressurized to the testing pressure and allowed to soak until transport properties remained constant over time (about 30-90 minutes depending on sample and gas mixtures). A retentate stream was added for mixed gas tests and adjusted to 100 times the permeate flow rate to maintain less than 1% stage cut. The permeate gas was collected and then injected into a gas chromatograph made available from Shimadzu Corporation, e.g., model GC-2014 Standard Capillary and Packed Gas Chromograph, to measure permeate composition. Permeate injections were performed at 95 torr. An Isco pump (Teledyne ISCO D-Series) was used to control the feed pressure.

The single gas permeation results are shown in Table II.

TABLE II

| Membranes | $P_{CO2}$ (Barrer) | $P_{CH4}$ (Barrer) | $\alpha_{CO2/CH4}$ |
|---|---|---|---|
| Neat Pebax Membrane | 60.59 | 2.61 | 23.21 |
| Pebax/PEGDA Membrane | 128.89 | 6.94 | 18.57 |
| Pebax/XLPEGDA Membrane 1 | 82.55 | 3.29 | 25.06 |
| XLPebax/XLPEGDA Membrane 1 | 62.12 | 2.28 | 27.28 |

As can be seen from Table 2, XLPebax/XLPEGDA membrane shows increased perselectivity for $CO_2/CH_4$ under the same testing conditions compared to neat Pebax, Pebax/PEGDA (without UV crosslinking) and Pebax/XLPEGDA membranes. More specifically, in the example above, the $CO_2/CH_4$ perselectivity of the XLPebax/XLPEGDA membrane was 27.28, which was higher than the $CO_2/CH_4$ perselectivities of the neat Pebax membrane (23.21), the Pebax/PEGDA membrane (18.57), and the Pebax/XLPEGDA membrane (25.06).

Figure 4:
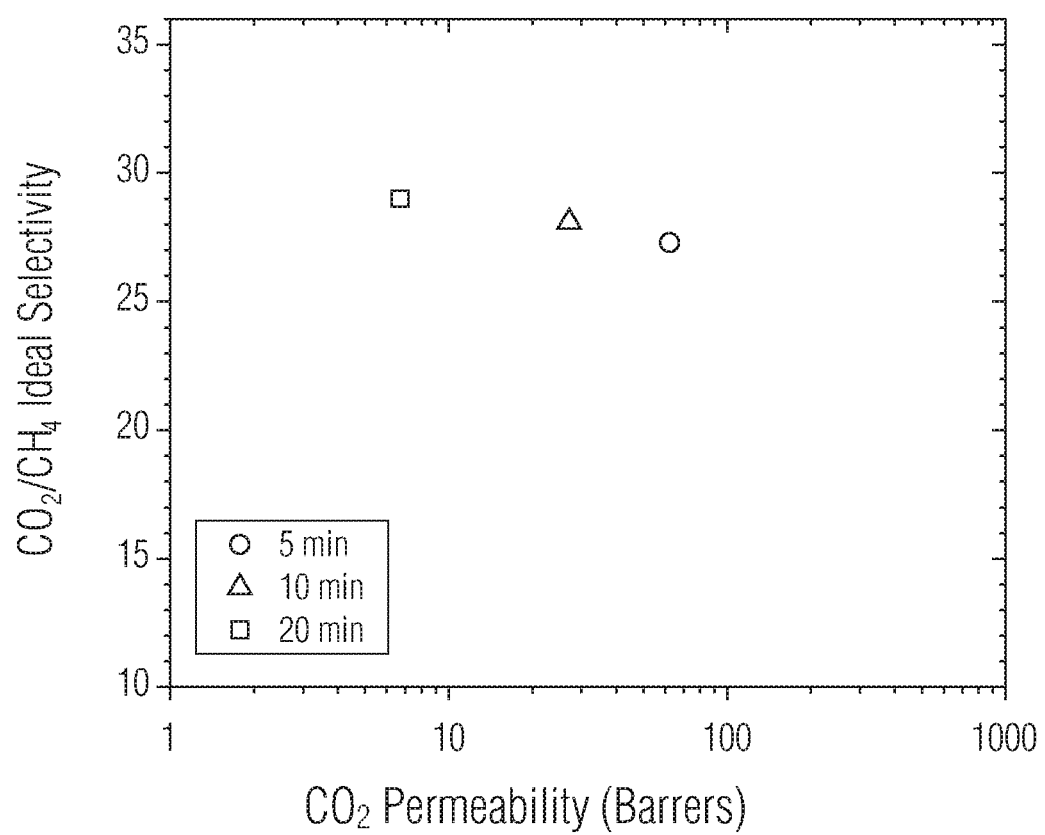
FIG. 4 is a graph showing selectivity and permeability for different crosslinking times for the XLPebax/XLPEDGA membrane.

The crosslinking time has a significant influence on the membrane separation performance. FIG. 4 is a graph showing selectivity and permeability for different crosslinking times for the XLPebax/XLPEDGA membrane. As can be seen from the Figure, XLPebax/XLPEGDA membranes show increased perselectivity for $CO_2/CH_4$, but decreased $CO_2$ permeability as crosslinking time increases. In the test example, at crosslinking time of 5 minutes, 10 minutes and 20 minutes, XLPebax/XLPEGDA membranes had $CO_2/CH_4$ single gas selectivities with 27.28, 28.09 and 29.0, respectively at crosslinking times of 5 min, 10 min and 20 min, and had $CO_2$ permeabilities of 62.12, 27.07 and 6.66, respectively.

Single gas permeation measurements are generally not sufficient to correctly evaluate membrane separation performance. As is common in membrane systems, there is a reduction in membrane performance under mixed gas conditions, because of unfavorable interactions between gases within the membrane matrix. For this reason, the mixed gas separation performance (both $CO_2/CH_4$ and $H_2S/CH_4$ selectivities) of XLPebax/XLPEGDA blended membranes was investigated using a 3-component mixture consisting of 3 vol % $CO_2$, 5 vol % $H_2S$ and 92 vol % $CH_4$ at a feed pressure of 200-800 psi and at 25° C. The mixed gas permeation results of experiments on different membranes are shown in Tables III and IV. The XLPebax/XLPEGDA membranes show significant increased mixed gas selectivities for $CO_2/CH_4$ and $H_2S/CH_4$, and comparable $CO_2$ permeability at feed pressure of 800 psi, in comparison with neat Pebax Membrane 1. In the first test, XLPebax/XLPEGDA Membrane 1 had $CO_2/CH_4$ and $H_2S/CH_4$ mixed gas selectivities of 19.16 and 112.47, while the neat Pebax Membrane had corresponding mixed gas selectivities of 17.55 and 102.80. In addition, the XLPebax/XLPEGDA Membrane 1 demonstrated increased mixed gas selectivities for $CO_2/CH_4$ and $H_2S/CH_4$ in comparison with Pebax/XLPEGDA Membrane 1, but decreased $CO_2$ and $H_2S$ permeabilities at feed pressure of 800 psi. Similar results were obtained for XLPebax/XLPEGDA Membrane 2 as shown in Table IV.

TABLE III

| | Permeability (Barrer) | | Selectivity | |
|---|---|---|---|---|
| Membranes | $P_{CO2}$ | $P_{H2S}$ | $\alpha_{CO2/CH4}$ | $\alpha_{H2S/CH4}$ |
| Neat Pebax Membrane | 72.30 | 425.61 | 17.55 | 102.80 |
| Pebax/XLPEGDA Membrane 1 | 93.52 | 550.40 | 18.61 | 109.54 |
| XLPebax/XLPEGDA Membrane 1 | 71.91 | 422.64 | 19.16 | 112.47 |

TABLE IV

| | Permeability (Barrer) | | Selectivity | |
|---|---|---|---|---|
| Membranes | $P_{CO2}$ | $P_{H2S}$ | $\alpha_{CO2/CH4}$ | $\alpha_{H2S/CH4}$ |
| Neat Pebax Membrane | 72.30 | 425.61 | 17.55 | 102.80 |
| Pebax/XLPEGDA Membrane 2 | 96.66 | 567.00 | 19.03 | 111.62 |
| XLPebax/XLPEGD Membrane 2 | 66.40 | 409.54 | 19.67 | 121.31 |

Figure 5A:
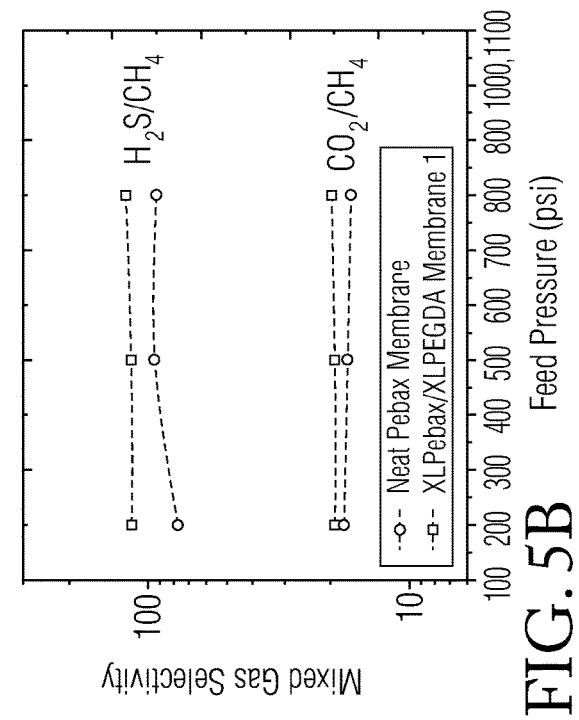
FIG. 5A is a graph showing the effect of feed pressure on the membrane permeability ($CO_2$, $H_2S$ and $CH_4$) of both Pebax and XLPebax/XLPEGDA membranes.
Figure 5B:
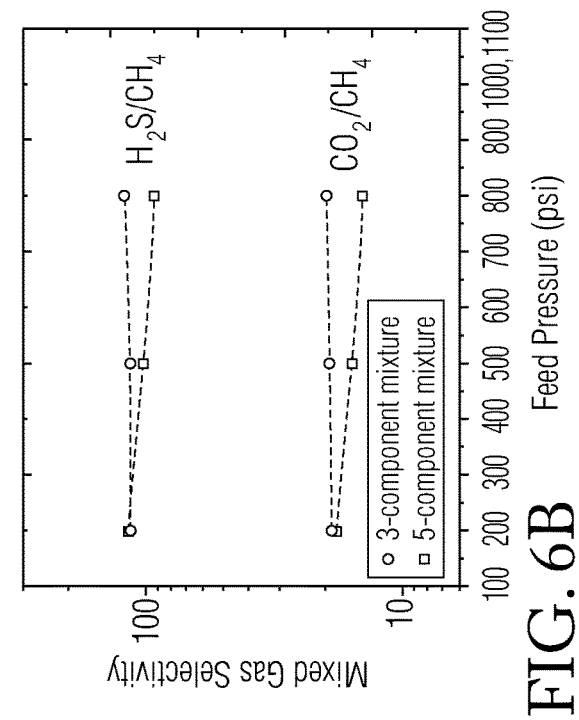
FIG. 5B is a graph showing the effect of feed pressure on selectivity ($CO_2/CH_4$ and $H_2S/CH_4$) of neat Pebax and XLPebax/XLPEGDA membranes.

FIG. 5A is a graph showing the effect of feed pressure on the membrane permeability ($CO_2$, $H_2S$ and $CH_4$) of both Pebax and XLPebax/XLPEGDA membranes and FIG. 5B is a graph showing the effect of feed pressure on selectivity ($CO_2/CH_4$ and $H_2S/CH_4$) of neat Pebax and XLPebax/XLPEGDA membranes. The same trends are observed for both neat Pebax Membrane and XLPebax/XLPEGDA Membrane 1 in that both show increasing permeabilities of $CO_2$, $H_2S$ and $CH_4$ as pressure increases from 200 psi to 800 psi. This is due to the swelling of the polymeric matrix at high feed pressure. Both membranes have similar permeabilities of $CO_2$ and $H_2S$ at the same feed pressure, but the increase in $CH_4$ permeability with feed pressure is lower in XLPebax/XLPEGDA membrane compared to neat Pebax membrane.

The smaller increase in permeability results in an increase of $CO_2/CH_4$ and $H_2S/CH_4$ selectivity for XLPebax/XLPEGDA membranes.

In real natural gas processing, multicomponent mixtures are likely to be present. Other gases, including hydrocarbons, are very common in natural gas wells and can plasticize polymer membranes. To simulate such multicomponent mixtures, a 5-component feed consisting of 10 vol % $CO_2$/20 vol % $H_2S$/10 vol % $N_2$/3 vol % $C_2H_6$/57 vol % $CH_4$ was used to simulate a real natural gas stream. Results of the 5-component test are shown in Table V. The results show that XLPebax/XLPEGDA membrane exhibited increased mixed gas selectivities for both $CO_2/CH_4$ and $H_2S/CH_4$ compared with both neat Pebax and Pebax/XLPEGDA membranes under the same testing conditions. In one example, XLPebax/XLPEGDA Membrane 2 had $CO_2/CH_4$ and $H_2S/CH_4$ mixed gas selectivities of 14.27 and 92.72, respectively; neat Pebax membrane had corresponding mixed gas selectivities of 12.79 and 80.08, and Pebax/XLPEGDA Membrane 2 had corresponding mixed gas selectivities of 13.43 and 85.06. As in the 3-component mixtures discussed above, XLPebax/XLPEGDA membrane exhibited comparable $CO_2$ and $H_2S$ permeabilities compared to neat Pebax membrane, but decreased $CO_2$ and $H_2S$ permeabilities compared to the Pebax/XLPEGDA membrane.

TABLE V

| Membranes | Permeability (Barrer) | | Selectivity | |
|---|---|---|---|---|
| | $P_{CO2}$ | $P_{H2S}$ | $\alpha_{CO2/CH4}$ | $\alpha_{H2S/CH4}$ |
| Neat Pebax Membrane | 285.85 | 1789.67 | 12.79 | 80.08 |
| Pebax/XLPEGDA Membrane 2 | 308.70 | 1955.1 | 13.43 | 85.06 |
| XLPebax/XLPEGDA Membrane 2 | 278.35 | 1808.61 | 14.27 | 92.72 |

In this case as well, TDI-crosslinking time has a significant influence on the membrane separation performance under 5-component mixture testing conditions. As can be seen from Table 6, both $CO_2/CH_4$ and $H_2S/CH_4$ selectivities of XLPebax/XLPEGDA membranes increased with the increase of crosslinking time, but $CO_2$ and $H_2S$ permeabilities decreased dramatically. It is believed that the decrease is due to the reduction of chain mobility after chemical crosslinking in membrane matrix, resulting in an increase of $T_g$.

TABLE VI

| Membranes | Crosslinking time (min) | Permeability (Barrer) | | Selectivity | |
|---|---|---|---|---|---|
| | | $P_{CO2}$ | $P_{H2S}$ | $\alpha_{CO2/CH4}$ | $\alpha_{H2S/CH4}$ |
| XLPebax/XLPEGDA Membrane 2 | 5 | 278.35 | 1808.61 | 14.27 | 92.72 |
| XLPebax/XLPEGDA Membrane 3 | 20 | 70.06 | 404.19 | 16.23 | 93.64 |

Figure 6A:
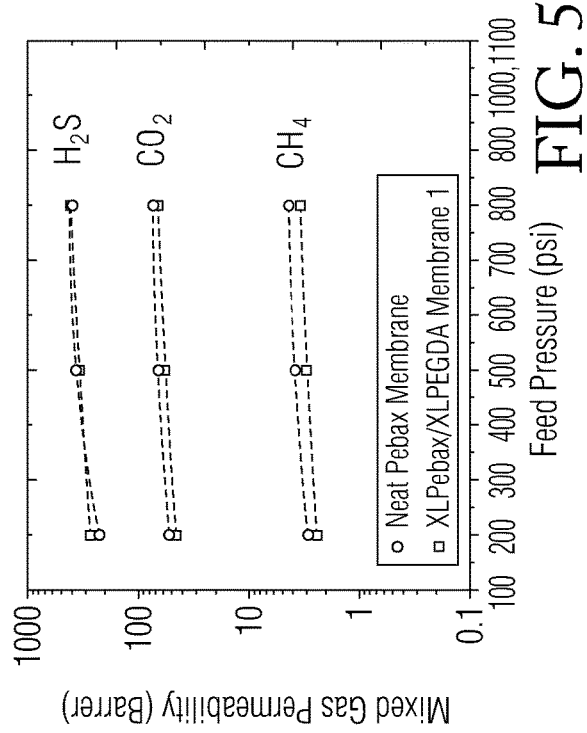
FIG. 6A is a graph of mixed gas permeability versus feed pressure for XLPebax/XLPEGDA membranes under various sour gas mixtures.
Figure 6B:
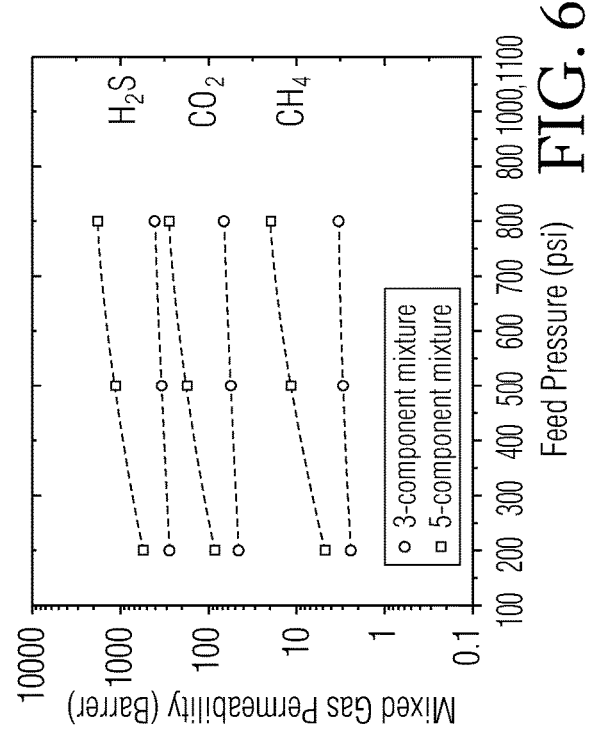
FIG. 6B is a graph of mixed gas selectivity versus feed pressure for XLPebax/XLPEGDA membranes under various sour gas mixtures.

FIGS. 6A and 6B are graphs of mixed gas permeability (FIG. 6A) and selectivity (FIG. 6B) versus feed pressure. The results indicate that the presence of additional gas components (e.g. $C_2H_6$) in the 5-component mixture enhances permeabilities of $CO_2$, $H_2S$ and $CH_4$ at increasing feed pressure while $CO_2/CH_4$ and $H_2S/CH_4$ selectivities in decrease with increased pressure in XLPebax/XLPEGDA membranes. These effects are likely due to greater plasticization in the 5-component mixture caused by the presence of additional condensable components such as $C_2H_6$, and to the high concentration of $CO_2$ and $H_2S$ in the feed. Similar trends were observed for neat Pebax membranes (not shown here).

Figure 7A:
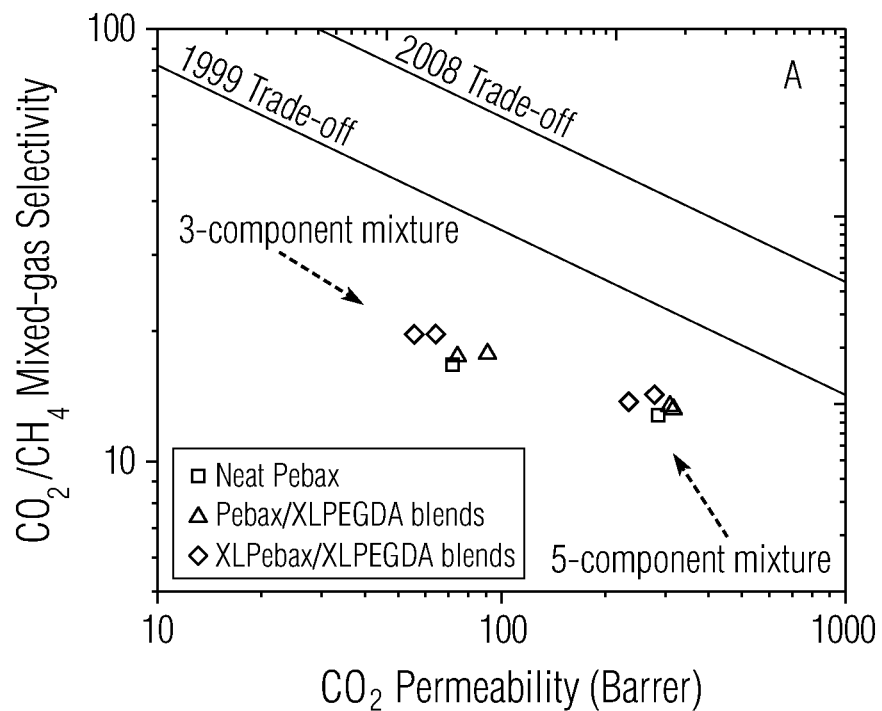
FIG. 7A is a graph of $CO_2/CH_4$ selectivity versus permeability for the various membranes.
Figure 7B:
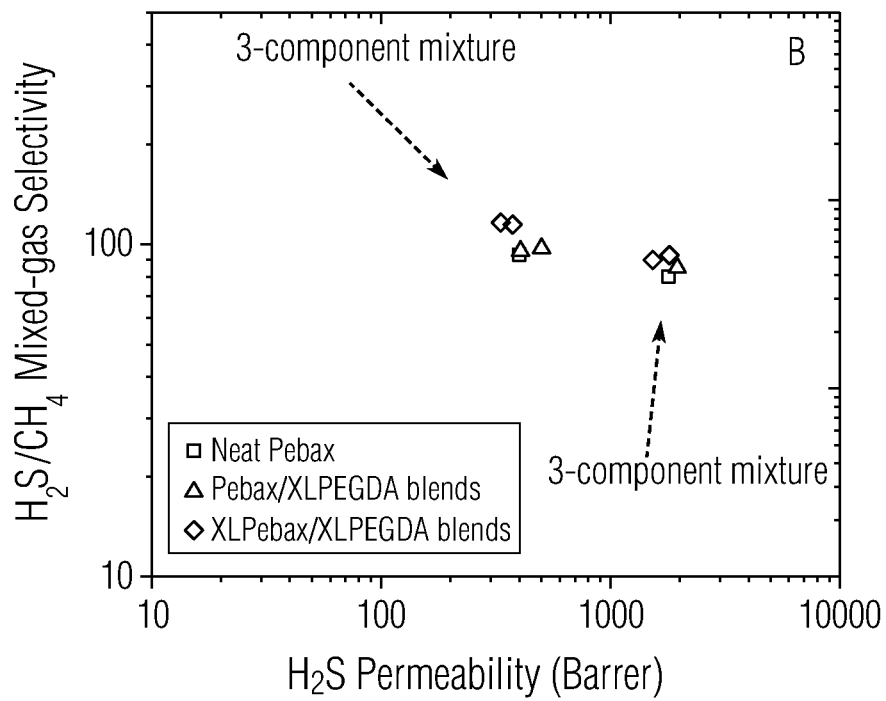
FIG. 7B is a graph of $H_2S/CH_4$ selectivity versus permeability for the various membranes.

Test results of sour gas separation (selectivity) performance ($CO_2/CH_4$ and $H_2S/CH_4$ selectivities) of the different membranes is shown in FIGS. 7A and 7B. FIG. 7A is a graph of $CO_2/CH_4$ selectivity versus permeability and FIG. 7B is a graph of $H_2S/CH_4$ selectivity versus permeability. The results show that the sour gas separation performance of XLPebax/XLPEGDA membrane show unexpectedly good performance under aggressive feed conditions. The XLPebax/XLPEGDA membrane exhibits large improvement in both $CO_2/CH_4$ and $H_2S/CH_4$ mixed gas selectivities at 800 psi in either 3-component or 5-component mixtures, compared to neat Pebax and Pebax/XLPEGDA membranes under the same feed stream conditions.

Figure 8A:
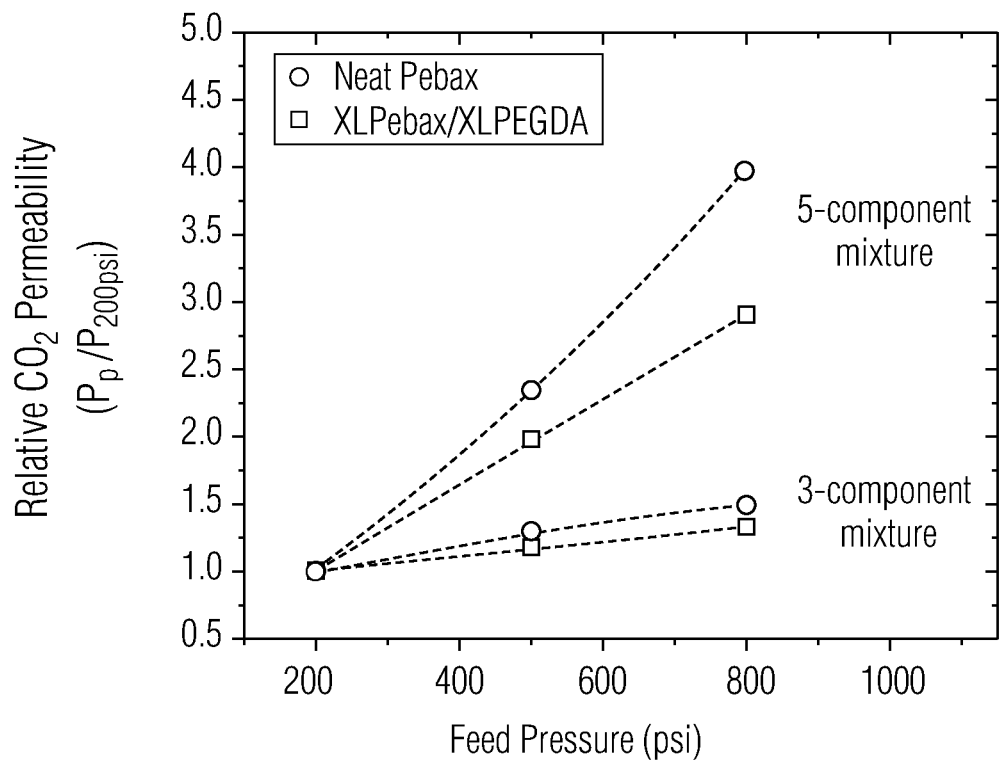
FIG. 8A is a graph of relative permeability of $CO_2$ for both 3 and 5-component sour gas mixtures for neat Pebax and XLPebax/XLPEGDA as a function of feed pressure.
Figure 8B:
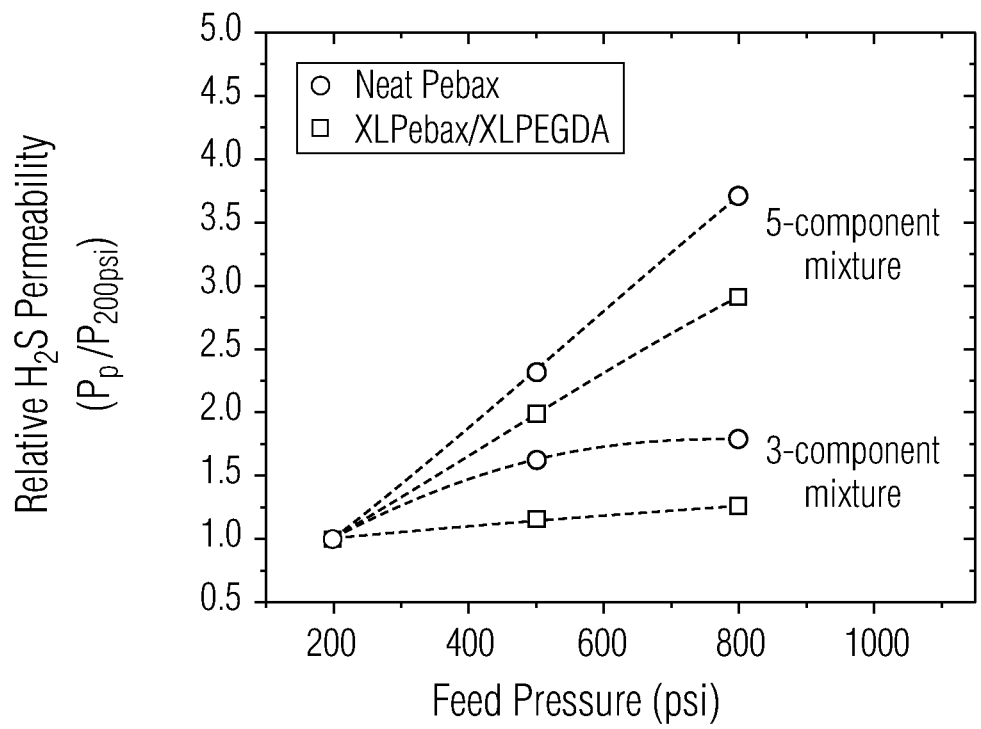
FIG. 8B is a graph of relative permeability of $H_2S$ for both 3 and 5-component sour gas mixtures for neat Pebax and XLPebax/XLPEGDA as a function of feed pressure.

Further tests were performed to investigate the effect of TDI-crosslinking on the plasticization resistance of XLPebax/XLPEGDA membranes in terms of the change of $CO_2$ and $H_2S$ relative permeabilities as a function of feed pressure. Relative permeability is the permeability at a given feed pressure divided by its permeability at 200 psi. FIG. 8A is a graph of relative permeability of $CO_2$ for both 3 and 5-component mixtures for neat Pebax and XLPebax/XLPEGDA as a function of feed pressure. FIG. 8B is a corresponding graph of relative permeability of $H_2S$ for both 3 and 5-component mixtures for neat Pebax and XLPebax/XLPEGDA as a function of feed pressure. Results of the tests show that the XLPebax/XLPEGDA membranes demonstrate enhancement in both $CO_2$ and $H_2S$ plasticization resistance under high sour gas streams (e.g. 10 vol % $CO_2$ and 20 vol % $H_2S$) compared to neat Pebax membranes. In one example, neat Pebax membrane exhibited a 134% and 298% increase in $CO_2$ and 132% and 271% increase in $H_2S$ permeabilities under the feed pressure of 500 psi and 800 psi, respectively, in comparison to permeabilities under feed pressure of 200 psi. In contrast, XLPebax/XLPEGDA membrane exhibits only about 97% and 190% relative increase in $CO_2$ and 98% and 190% increase in $H_2S$ permeabilities under the feed pressures of 500 psi and 800 psi, respectively. This is mainly attributed to the chemical crosslinking and formation of rigid crosslinked networks via urethane linkages in the XLPebax/XLPEGDA membranes.

In sum, the XLPebax/XLPEDGA membrane has many advantages, the extent of which are unexpected. The XLPebax/XLPEGDA membranes demonstrate a significant increase in tensile stress and Young's modulus compared to near Pebax, Pebax/PEGDA and Pebax/XLPEGDA and XLPebax (without XLPEGDA). The XLPebax/XLPEGDA membranes show increased single gas selectivity for $CO_2/CH_4$ under the same testing conditions (feed temperature of 25° C., feed pressure of 100 psi), compared to neat Pebax, Pebax/PEGDA, and Pebax/XLPEGDA membranes. For example, in one example, an XLPebax/XLPEGDA membrane had a CO₂/CH₄ single gas selectivity with 27.28, compared to neat Pebax membrane with 23.21, Pebax/PEGDA membrane with 18.57, and Pebax/XLPEGDA membrane with 25.06. Under 3-component mixed gas testing conditions (3 vol % $CO_2$/5 vol % $H_2S$/92 vol % $CH_4$) at 800 psi, the XLPebax/XLPEGDA membranes show significant increased mixed gas selectivities both for $CO_2/CH_4$ and $H_2S/CH_4$ at feed pressure of 800 psi compared to neat Pebax membrane and Pebax/XLPEGDA membranes. In addition, the XLPebax/XLPEGDA membranes demonstrate enhanced mixed gas selectivities for both $CO_2/CH_4$ and $H_2S/CH_4$ at feed pressure of 800 psi compared to neat Pebax membrane and Pebax/XLPEGDA membrane in 5-component mixed gas testing.

The crosslinking time has a significant influence on membrane $CO_2/CH_4$ selectivity. In one example, the $CO_2/CH_4$ mixed gas selectivity for XLPebax/XLPEGDA membrane increased from 19.67 to 22.29 when crosslinking time increased from 5 min to 20 min under 3-component mixture testing conditions. Similarly, the $CO_2/CH_4$ mixed gas selectivity for XLPebax/XLPEGDA membrane increased from 14.27 to 16.23 when crosslinking time increased from 5 min to 20 min under 5-component mixture testing conditions.

Furthermore, the XLPebax/XLPEGDA membranes demonstrate enhancement in both $CO_2$ and $H_2S$ plasticization resistance under high sour gas streams (e.g. 10 vol % $CO_2$ and 20 vol % $H_2S$) compared to neat Pebax membranes. This is mainly attributed to the chemical crosslinking and formation of rigid crosslinked networks via urethane linkages in membrane matrix.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and "comprising", when used in this specification, specify the presence of stated features, integers, steps, operations, elements, or components, but do not preclude the presence or addition of one or more other features, integers, steps, operations, elements, components, or groups thereof.

Terms of orientation are used herein merely for purposes of convention and referencing and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method of making a gas separation membrane comprising:
    dissolving and mixing poly(ether-b-amide) (Pebax) copolymer and acrylate-terminated polyethylene glycol oligomers (PEGDA) in a solvent to define a polymer solution;
    casting the polymer solution into a mold;
    removing the solvent to form a film;
    adding a photoinitiator to the film and irradiating the film with ultraviolet radiation to induce crosslinking of the PEGDA in the film, producing XLPEGDA; and
    submerging the film, after exposure to the ultraviolet radiation, in a crosslinking solution to form crosslinked Pebax (XLPebax) in the film, wherein the crosslinking solution comprises one of a diisocyanate, a diisocyanate derivative and a combination of a diiscyanate and a diisocyanate derivative.

2. The method of claim 1, wherein the diisocyanate derivative comprises a diisocyanate polyether having a formula:

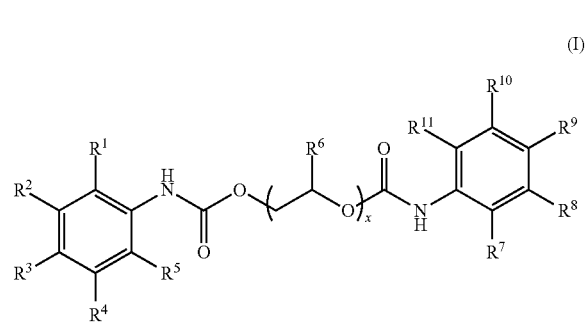

(I)

in which each $R^6$ is independently an alkyl or —H; x is from 1 to 200; and
$R^1$, $R^2$, $R^3$, $R^4$, $R^5$, $R^7$, $R^8$, $R^9$, $R^{10}$, and $R^{11}$ is independently —C≡N≡O, alkyl or —H, provided that at least one and not more than two of $R^1$, $R^2$, $R^3$, $R^4$ and $R^5$ is —C≡N≡O and at least one and not more than two of $R^7$, $R^8$, $R^9$, $R^{10}$, and $R^{11}$ is independently —C≡N≡O.

3. The method of claim 1, wherein the diisocyanate comprises tolylene-2,4-diisocyanate (TDI), hexamethylenediisocyanate (HDI), 4,4'-Methylenediphenyl diisocyanate (MDI), or Dimethoxy biphenylene diisocyanate (DMDI).

4. The method of claim 1, wherein the photoinitiator comprises 1-hydroxycyclohexyl phenyl ketone (HCPK), benzophenone or combinations thereof.

5. The method of claim 1, wherein in the dissolving step, the PEGDA comprises between about 1 wt. % and about 90 wt. % of the Pebax.

6. The method of claim 4, wherein the PEGDA comprises between about 5 wt. % and 80 wt. % of the Pebax.

7. The method of claim 2, wherein in the submerging step, the crosslinking solution comprises a 0.5 wt. % to 10 wt. % solution of TDI in hexane.

8. The method of claim 1, wherein the film is submerged in crosslinking solution for between 5 and 25 minutes.

9. A gas separation membrane comprising:
- a cross-linked poly(ether-b-amide) copolymer (XLPebax), in which the poly(ether-b-amide) copolymer comprises urethane crosslinks which is the reaction product of poly(ether-b-amide) copolymer and a diisocyanate derivative; and
- a poly(ether-b-amide) copolymer, crosslinked to an acrylate-terminated poly(ethylene glycol) (XLPEGDA).

10. The gas separation membrane of claim 9, wherein the diisocyanate derivative comprises a polyether having a formula:

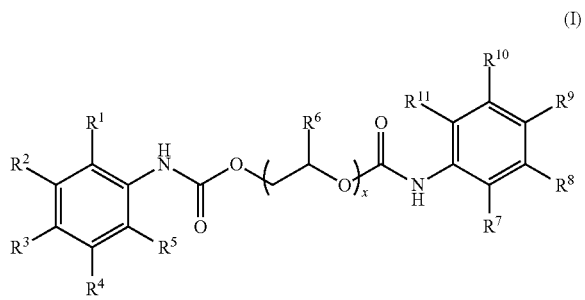

(I)

in which each $R^6$ is independently an alkyl or —H; x is from 1 to 200; and $R^1$, $R^2$, $R^3$, $R^4$, $R^5$, $R^7$, $R^8$, $R^9$, $R^{10}$, and $R^{11}$ is independently —C=N=O, alkyl or —H, provided that at least one and not more than two of $R^1$, $R^2$, $R^3$, $R^4$ and $R^5$ is —C=N=O and at least one and not more than two of $R^7$, $R^8$, $R^9$, $R^{10}$, and $R^{11}$ is independently —C=N=O.

11. The gas separation membrane of claim 9, wherein the diisocyanate of the diisocyanate derivative comprises tolylene-2,4-diisocyanate (TDI), hexamethylene-diisocyanate (HDI), 4,4'-Methylenediphenyl diisocyanate (MDI), or Dimethoxy biphenylene diisocyanate (DMDI).

12. The gas separation membrane of claim 9, wherein the membrane has of a thickness ranging from about 30 micrometers to about 70 micrometers (μm).

13. The gas separation membrane of claim 9, wherein the PEGDA comprises between about 1 wt. % and about 90 wt. % of the Pebax within the membrane.

14. The gas separation membrane of claim 13, wherein the PEGDA comprises between about 5 wt. % and about 80 wt. % of the Pebax within the membrane.

* * * * *